US008896574B2

(12) United States Patent
Hsu et al.

(10) Patent No.: US 8,896,574 B2
(45) Date of Patent: Nov. 25, 2014

(54) OPTICAL TOUCH APPARATUS

(75) Inventors: Long Hsu, Hsinchu (TW); Meng-Shin Yen, Taipei (TW); William Wang, Taoyuan (TW); Chung-Cheng Chou, Luzhu Township, Taoyuan County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 480 days.

(21) Appl. No.: 12/849,131

(22) Filed: Aug. 3, 2010

(65) Prior Publication Data

US 2011/0032217 A1    Feb. 10, 2011

(30) Foreign Application Priority Data

Aug. 4, 2009 (TW) ................................ 98126170 A

(51) Int. Cl.
*G06F 3/042* (2006.01)
*G06F 3/041* (2006.01)

(52) U.S. Cl.
CPC .................................... *G06F 3/0428* (2013.01)
USPC ............ 345/175; 345/166; 345/173; 345/176

(58) Field of Classification Search
CPC ....... G06F 3/041; G06F 3/042; G06F 3/0421; G06F 3/0423; G06F 3/0425; G06F 3/0426; G06F 3/0428

USPC .......................................... 345/156, 173–179
See application file for complete search history.

(56) References Cited

U.S. PATENT DOCUMENTS

| 7,656,391 B2* | 2/2010 | Kimura et al. ................. 345/173 |
| 2006/0187199 A1* | 8/2006 | Lieberman .................... 345/156 |
| 2008/0062149 A1* | 3/2008 | Baruk ............................ 345/175 |
| 2008/0111796 A1* | 5/2008 | Atkins et al. .................. 345/175 |
| 2009/0058832 A1* | 3/2009 | Newton ......................... 345/175 |
| 2009/0135162 A1* | 5/2009 | Van De Wijdeven et al. 345/175 |
| 2009/0237376 A1* | 9/2009 | Bridger ......................... 345/175 |
| 2010/0253637 A1* | 10/2010 | Lieberman et al. ........... 345/173 |

* cited by examiner

*Primary Examiner* — Kent Chang
*Assistant Examiner* — William Lu

(57) ABSTRACT

The invention provides an optical touch apparatus. The optical touch apparatus includes at least one optical path unit and at least one light sensing unit. The at least one optical path unit is located on a first side of a display unit of the optical touch apparatus and used to receive at least one directional incident light, the at least one directional incident light is focused to form an image in an imaging region through at least one refraction in the at least one optical path unit. The at least one light sensing unit is located at a relative position of the at least one optical path unit, and used to generate a sensing result according to the image in the imaging region.

12 Claims, 6 Drawing Sheets

OPTICAL TOUCH APPARATUS

BACKGROUND OF THE INVENTION

1. Field of the Invention

The present invention relates to optical touch, and more particularly, to an optical touch apparatus capable of receiving light signals of various directions in the display unit and reducing the imaging error of the image.

2. Description of the Prior Art

In recent years, with the continuous development of the touch image display technology, the conventional input function of the keyboard and mouse has been gradually replaced by various touch technological products. Accordingly, it is unnecessary to dispose keyboard on the electronic products or bring other input devices, so that the convenience and flexibility of the electronic products can be enhanced. In addition, since it is unnecessary to keep a region on the electronic product to dispose the keys, therefore, the size of the display monitor on the electronic product can be increased to provide the user better visual enjoyment and accuracy of the inputted data.

Please refer to FIG. 1. FIG. 1 shows a scheme diagram of the conventional optical touch apparatus 2. As shown in FIG. 1, the conventional optical touch apparatus 2 includes a display unit 20 and a light sensing module 28, wherein the light sensing module 28 includes a light path unit 22 and a light sensing unit 24. It should be noticed that the conventional light path unit 22 is an optical lens with three-dimensional spherical surface, a surface of the spherical lens is a flat surface needed to be fixed at one side of the display unit 20.

Since the conventional spherical lens is a lens with single curvature, when the spherical lens is disposed on the display unit 20, the volume of the conventional optical touch apparatus 2 should be increased, so that the cost will be increased and the beauty of space design will be also damaged.

Moreover, the imaging state of the light sensing module 28 is shown in FIG. 2A, FIG. 2A shows an enlarged diagram of the conventional light sensing module 28 in FIG. 1. It should be noticed, from y-z axis direction, it can be found that the imaging region $A_s$ on the light sensing unit 24 is only a part of the maximum area of the light path unit 22, as shown in FIG. 2B. Therefore, whether the light sensing unit 24 in the light sensing module 28 is disposed on the predetermined position should be noticed. In other words, the selected position of the light sensing module 28 should be totally matched with the sensing region and background in a predetermined range, so that the functions of sensing and capturing effective image can be achieved. Therefore, it is important to select suitable light sensing module 28.

If the light sensing module 28 is disposed at one side of the display unit 20, the light sensing module 28 may be removed from its original position due to the factors such as assembly or transport vibration, then the light sensing module 28 will fail to sense the effectively readable image signals, as shown in FIG. 2C.

Therefore, the invention provides an optical touch apparatus to solve the aforementioned problems.

SUMMARY OF THE INVENTION

A scope of the invention is to provide an optical touch apparatus having suitable design of optical lens to make the light sensing module capable of receiving light signals effectively and ensuring that the light signals can be precisely identified by the light sensing module to lower the image error.

An embodiment of the invention is an optical touch apparatus. The optical touch apparatus includes at least one light path unit, at least one sensing unit, a display unit, and a processing module. The at least one light path unit is disposed at a first side of the display unit, and the at least one light path unit is used for receiving at least one directional incident light. The at least one directional incident light is focused to form an image in an imaging region through at least one refraction in the at least one optical path unit. Wherein, the at least one optical path unit is used for receiving the incident light in the display unit via a design of a lens. And, a first surface of the lens is a protruding curved surface, the protruding curved surface comprises at least one curvature, and a second surface of the lens is adhered to the first side of the display unit.

In this embodiment, the at least one light sensing unit is disposed on a relative position of the at least one light path unit, the at least one light sensing unit is used to generate a sensing result according to the image in the imaging region, wherein the at least one light path unit and the at least one light sensing unit can combined to become a light sensing module. The processing module is coupled to the at least one light sensing unit, and used to determine at least one touch point position formed by at least one object on the display unit.

Above all, the optical touch apparatus provided by the invention uses the suitable design of the light path unit to make the light sensing module capable of effectively receiving light signals to improve the conventional complicated process of aligning the sensing module accurately. In addition, because the invention effectively enlarges the imaging region, the misjudgment of the touch apparatus caused by the errors generated when the system processes the image can be prevented. In addition, the invention can not only shrink the space of the lens, but also increase the acceptable error of the light sensing module when fabrication, to further achieve the effects of reducing the cost of optical lens and increasing the sensitivity and stability of image capture.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
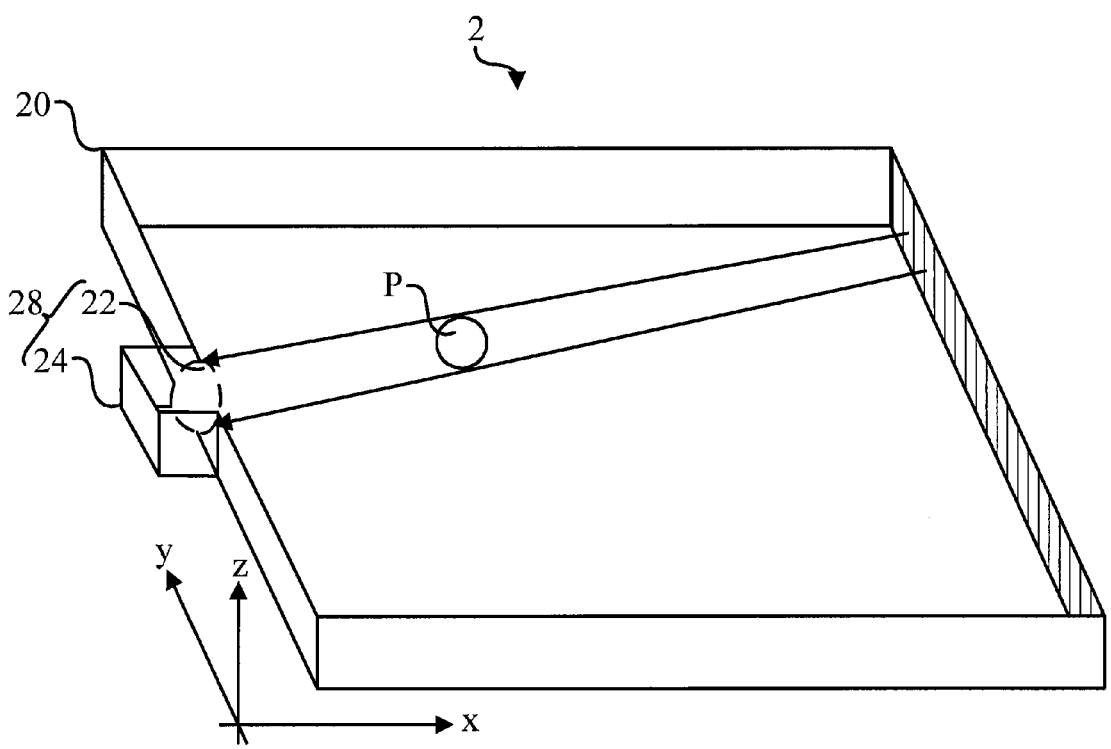
FIG. 1 illustrates a scheme diagram of the conventional optical touch apparatus.
Figure 2A:
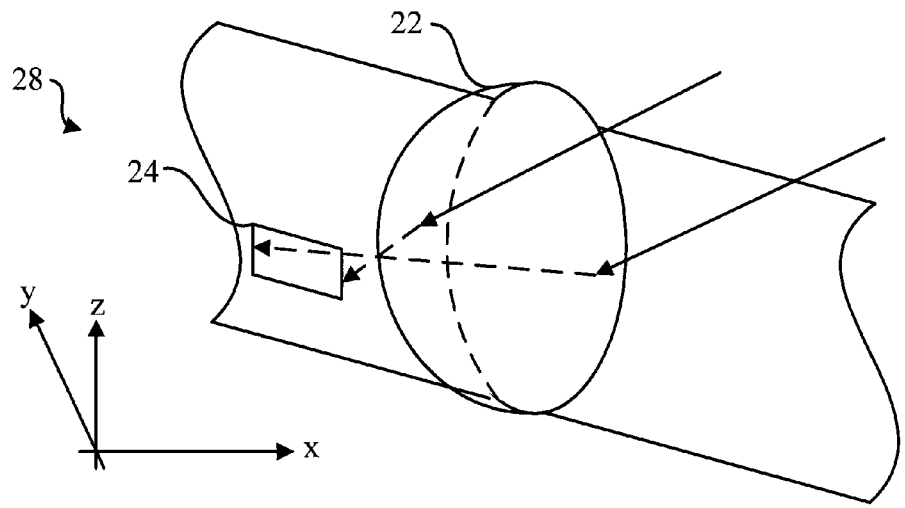
FIG. 2A illustrates an enlarged diagram of the conventional light sensing module in FIG. 1.
Figure 2B:
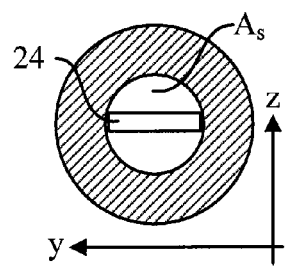
FIG. 2B illustrates a scheme diagram of a possible image in the y-z direction in FIG. 2A.
Figure 2C:
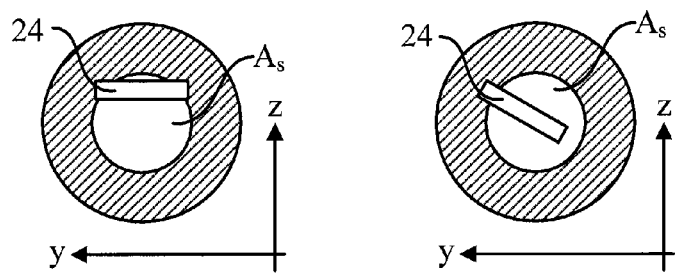
FIG. 2C illustrates a scheme diagram of a possible condition of the image in the y-z direction.
Figure 3:
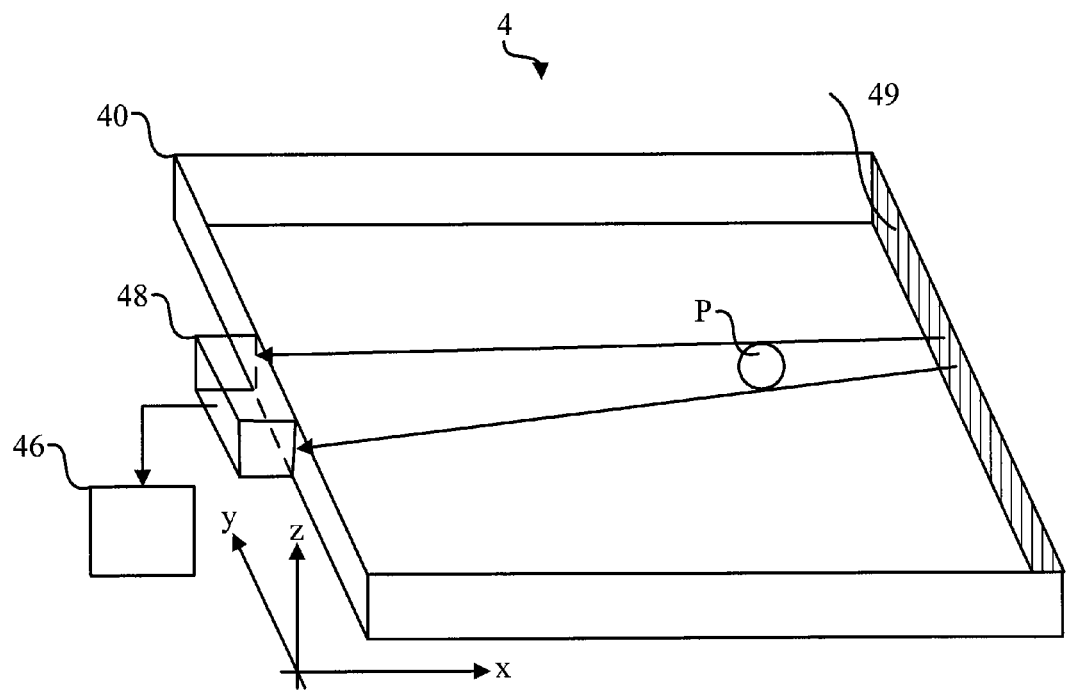
FIG. 3 illustrates a scheme diagram of the optical touch apparatus in an embodiment of the invention.

An embodiment of the invention is an optical touch apparatus. In this embodiment, the optical touch apparatus can be applied to the liquid crystal display or other display apparatuses to make it have the functions of image displaying and touch inputting. Please refer to FIG. 3. FIG. 3 shows a scheme diagram of the optical touch apparatus 4 in an embodiment of the invention.

As shown in FIG. 3, the optical touch apparatus 4 includes a display unit 40, at least one light path unit 42, at least one light sensing unit 44, and a processing module 46. Wherein, the user can touch a surface of the display unit 40 via his/her finger or other object to perform the input function, but not limited to this case.

In this embodiment, the at least one light path unit 42 is disposed at a first side of the display unit 40 of the optical touch apparatus 4, and the at least one light path unit 42 is used to receive an incident light. It should be noticed that at least one refraction of the received incident light is done in the at least one optical path unit 42 to be focused to form an image in an imaging region.

The at least one light sensing unit 44 is disposed on a relative position of the at least one light path unit 42, and the at least one light sensing unit 44 is used to generate a sensing result according to the image in the imaging region. In practical applications, the at least one light path unit 42 and the at least one light sensing unit 44 can be combined to become a light sensing module 48. And, a plurality of light sensing modules 48 can be disposed at the sides of the display 40 based on actual needs of the user to increase the accuracy and stability of the optical touch apparatus 4.

It should be noticed that the light sensing module 48 can be any types of light sensors, such as the photoelectric sensor (e.g., the charge-coupled-device (CCD) sensor, the complementary metal-oxide-semiconductor (CMOS) sensor), the light-pressure sensor, the photo-thermal sensor, the photo-acoustic sensor, and the magneto-optical sensor. In this invention, the light sensing module 48 cooperated with the light path unit 42 of the invention can achieve the effect of receiving the light effectively and improve the drawback of the conventional spherical lens.

The processing module 46 is coupled to the at least light sensing unit 44, and used to determine at least one touch point position formed by the at least one object on the display unit 40 according to the sensing result. In fact, since the processing module 46 obtains the coordinates of the moved touch point by comparing the difference between the positions before and after the movement of the touch point, therefore, complicated calculation can be prevented to reduce the wasted time and increase the reaction rate of the optical touch apparatus 4.

Figure 4:
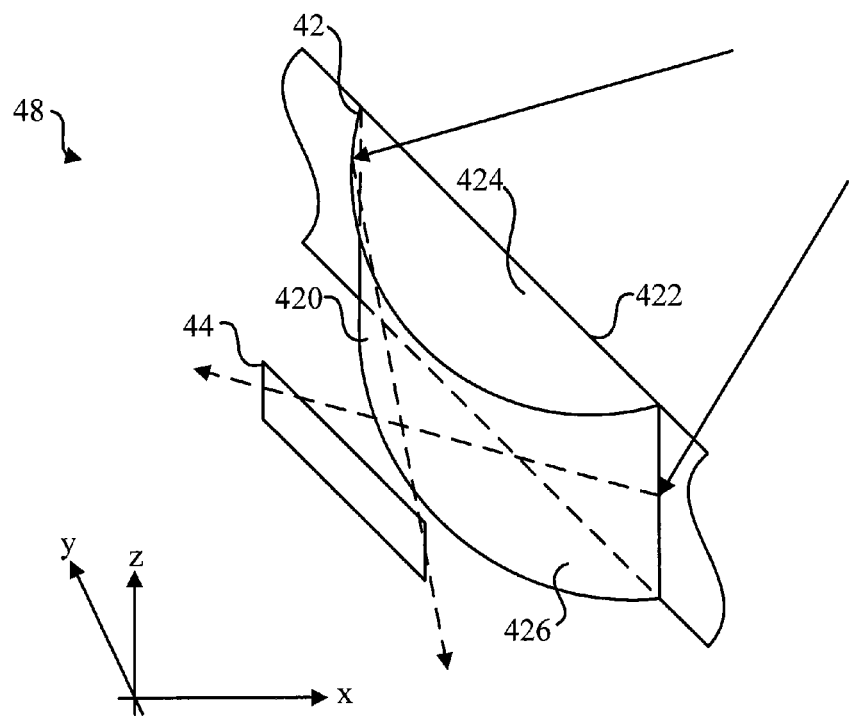
FIG. 4 illustrates an enlarged diagram of the light sensing module in FIG. 3.

Please refer to FIG. 4. FIG. 4 shows an enlarged diagram of the light sensing module 48 in FIG. 3. As shown in FIG. 4, the light path unit 42 receives the incident lights of the display unit 40 through suitable design of the lens. In this embodiment, a first surface 420 of the lens of the light path unit 42 is a protruding curved surface, and the protruding curved surface includes at least one curvature. And, a second surface 422 opposite to the first surface 420 is used to be adhered to a first side of the display unit 40. In practical applications, the range of the first side covers all regions of the first side of the display unit 40 except the display surface, so that the position that the light path unit 42 disposed is not limited by the case shown in FIG. 4. In addition, the lens also includes a third surface 424 and a fourth surface 426, and the third surface 424 is symmetrical to the fourth surface 426.

It should be noticed that the protruding curved surface of the lens can be designed to be different curvatures based on actual needs of the user. When the at least one directional incident light enters into the light path unit 42, the light path unit 42 can generate refractions of different angles via the protruding curved surfaces with different curvatures to further control the incident light and imaging region.

Figure 5A:
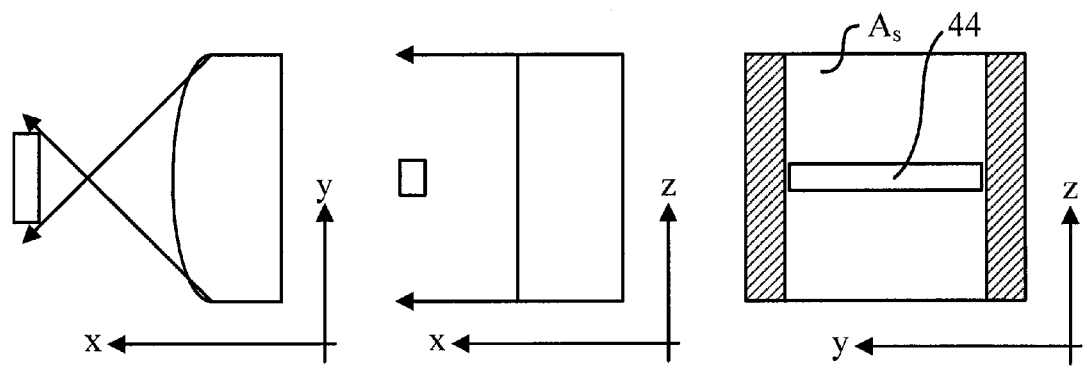
FIG. 5A illustrates three views of imaging by the incident light through the light path unit.
Figure 5B:
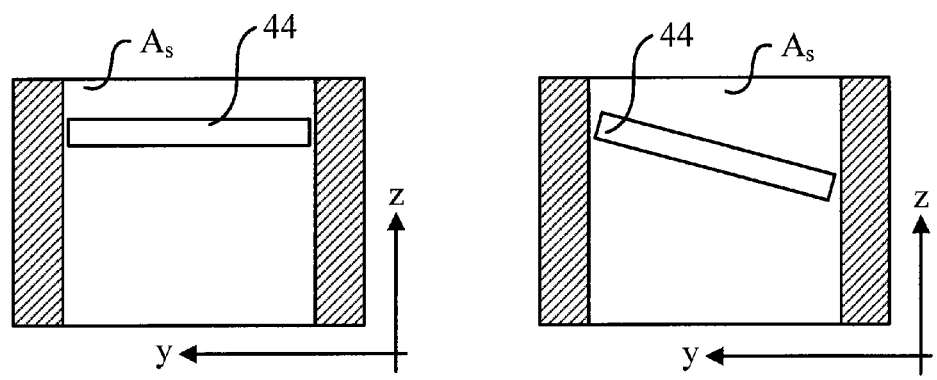
FIG. 5B illustrates a scheme diagram of a possible image in the y-z direction in FIG. 5A.

Please refer to FIG. 5A. FIG. 5A shows three views of imaging by the incident light through the light path unit 42. As shown in FIG. 5A, the imaging range of the light path unit 42 of the invention is a rectangle and the image on the display unit 40 can be captured more effectively, so that it is different from that in prior arts. After the at least one directional incident light is emitted into the light path unit 42 and refracted at least one time in the light path unit 42, the at least one directional incident light will form an image in the imaging region $A_s$, and the image can be smoothly outputted to the light sensing unit 44. Moreover, a y-z axis view can be used to clearly show the imaging difference between the invention and the conventional lens, as shown in FIG. 5B. Even a little bit errors may be occurred when the light sensing unit 44 is disposed; however, the light sensing unit 44 can still image within the imaging region $A_s$ with the light path design of the invention, so that the image signals can be provided to be determined and the drawbacks of the prior arts can be improved.

Figure 6A:
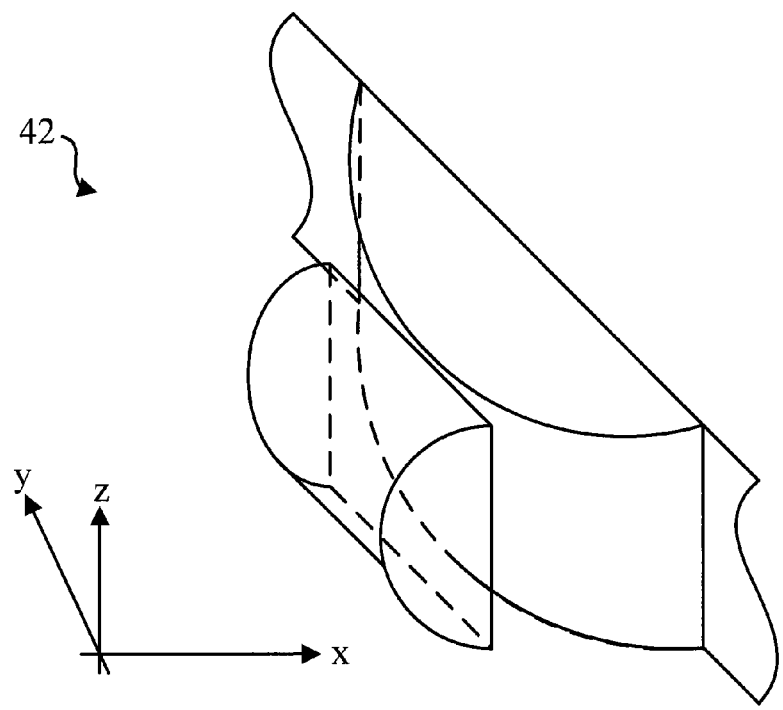
FIG. 6A illustrates a scheme diagram of the light path unit including a combination of two lenses.
Figure 6B:
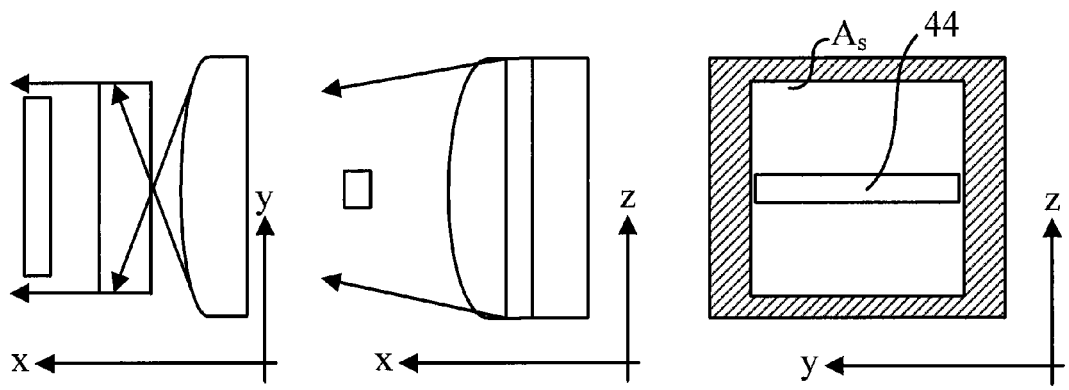
FIG. 6B illustrates three views of imaging by the incident light through the light path unit in FIG. 6A.

In addition, since the light path unit 42 of the invention is used to control the refraction of the incident light, therefore, two or more light path units 42 can be also used to achieve the same effect. Please refer to FIG. 6A and FIG. 6B. FIG. 6A shows a scheme diagram of the light path unit 42 including a combination of two lenses; FIG. 6B shows three views of imaging by the incident light through the light path unit 42 in FIG. 6A. As shown in FIG. 6A and FIG. 6B, two lenses having the same structures can be combined in different directions to form the light path unit 42, or two lenses having different structures can be also combined to form the light path unit 42. After the light path unit 42 receives the incident light, the incident light can be focused by the first lens at first, and then refracted by the second lens, so that the light sensing unit 44 may be disposed within the imaging region $A_s$. Therefore, the light sensing module 48 of the invention can effectively improve the errors occurred when the light sensing unit 44 is fabricated to increase the fabrication efficiency and the effective range of determining the image signal of the light sensing unit 44.

Figure 7A:
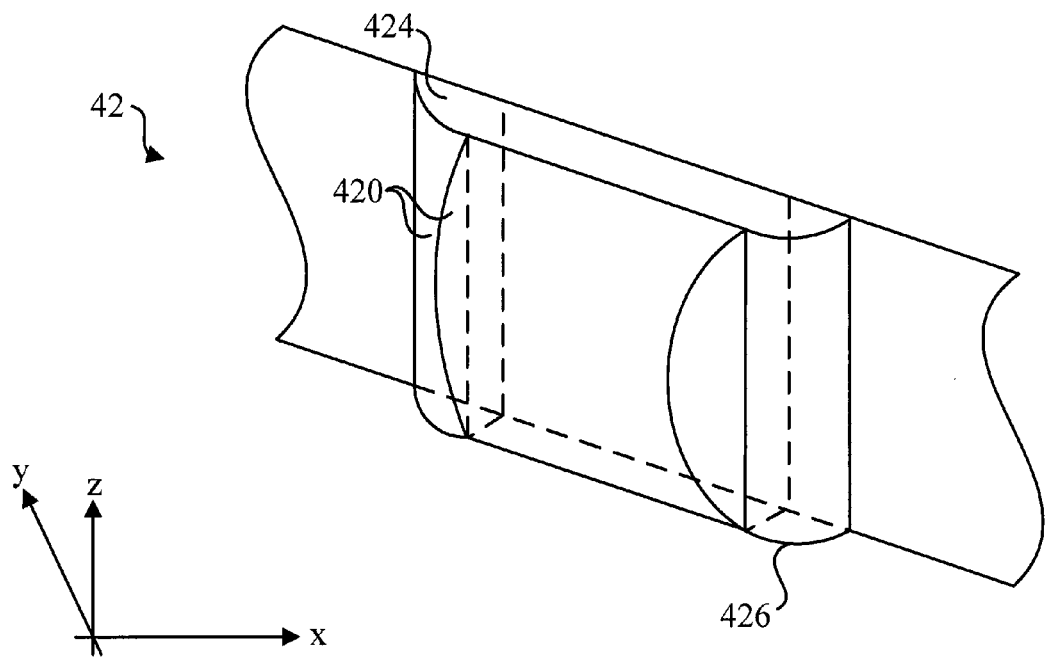
FIG. 7A illustrates a scheme diagram of the first surface of the light path unit including two curvatures.
Figure 7B:
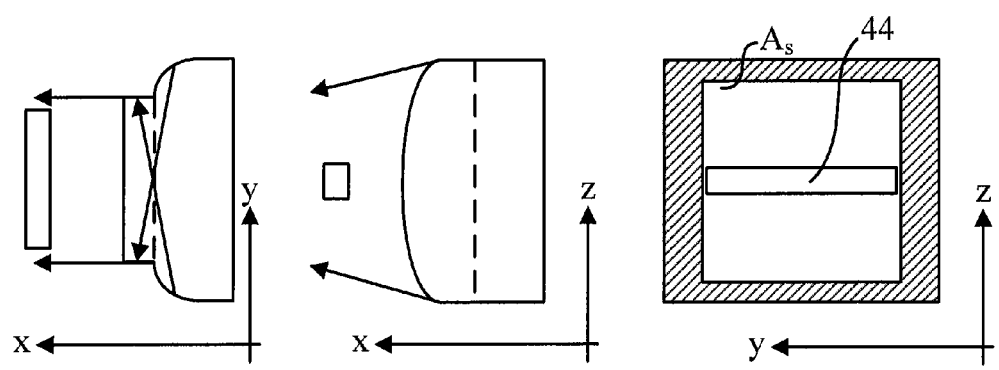
FIG. 7B illustrates three views of imaging by the incident light through the light path unit in FIG. 7A.

Please refer to FIG. 7A and FIG. 7B. FIG. 7A shows a scheme diagram of the first surface 430 of the light path unit 42 including two curvatures; FIG. 7B shows three views of imaging by the incident light through the light path unit 42 in FIG. 7A. As shown in FIG. 7A and FIG. 7B, the first surface 420 of the light path unit 42 includes a curved surface with a small curvature and a curved surface with a large curvature. It should be noticed that this design of the light path unit 42 can generate the needed refraction angle when the incident light is emitted to the curved surfaces with different curvatures. Therefore, the light sensing unit 44 can be smoothly disposed within the imaging region $A_s$ to provide effectively determined image signals to increase the error tolerance range of fabrication. In addition, the amount of the optical lens used can be reduced by this design of the invention to reduce the volume and the cost of the optical touch apparatus 4.

Please refer to FIG. 3. When at least one object P blocks at least one directional incident light over the display unit 40, a change of the image will be caused, and at least one light sensing unit 44 will generate a sensing result according to the changing condition of the image. In practical applications, the object P can be a finger, a touch pen, or other objects capable of blocking the incident light, but not limited by this case.

It should be noticed that the sensing result can be related to the comparing results between the at least one object P and the reference region 49. In this embodiment, the reference region 49 is disposed at a second side opposite to the first side of the display unit 40. Wherein, the reference region 49 includes at least one reference pattern, and the at least one reference pattern is shown in a light and dark interlacing way, and compared with the at least one object P to generate the comparing result. In fact, the comparing result relates to a proportion of a covered region to the reference region 49, the covered region 49 is formed when the at least one object P blocks the at least one directional incident light.

Compared to the prior arts, the optical touch apparatus provided by the invention uses the suitable design of the light path unit to make the light sensing module capable of effectively receiving light signals to improve the conventional complicated process of aligning the sensing module accurately. In addition, because the invention effectively enlarges the imaging region, the misjudgment of the touch apparatus caused by the errors generated when the system processes the image can be prevented. In addition, the invention can not only shrink the space of the lens, but also increase the acceptable error of the light sensing module when fabrication, to further achieve the effects of reducing the cost of optical lens and increasing the sensitivity and stability of image capture.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical touch apparatus, comprising:
    at least one optical path unit, located at a first side of a display unit of the optical touch apparatus, for receiving at least one directional incident light, the at least one directional incident light being focused to form an image in an imaging region through at least one refraction in the at least one optical path unit; and
    at least one light sensing unit, located at a position relative to the at least one optical path unit, for generating a sensing result according to the image in the imaging region;
    wherein the imaging region formed by the at least one optical path unit is larger than the at least one light sensing unit thereby increasing the acceptable error of the placement of the at least one light sensing unit during fabrication;
    wherein the at least one optical path unit is composed of a plurality of lenses;
    wherein the plurality of lenses has the same shape;
    wherein the plurality of lenses has different sizes combined in different directions; and
    wherein a first surface of the at least one optical path unit comprises two curvatures.

2. The optical touch apparatus of claim 1, wherein the at least one optical path unit is used for receiving the incident light in the display unit via a design of a lens.

3. The optical touch apparatus of claim 2, wherein a first surface of the lens is a protruding curved surface, the protruding curved surface comprises at least one curvature.

4. The optical touch apparatus of claim 3, wherein a second surface of the lens is adhered to the first side of the display unit.

5. The optical touch apparatus of claim 3, wherein the lens further comprises a third surface and a fourth surface, the third surface is symmetrical to the fourth surface.

6. The optical touch apparatus of claim 1, wherein after the at least one directional incident light finishes the at least one refraction in the at least one optical path unit, the at least one directional incident light forms the image in the imaging region, and the image is outputted to the at least one light sensing unit.

7. The optical touch apparatus of claim 1, wherein the at least one optical path unit and the at least one light sensing unit are combined to become a light sensing module.

8. The optical touch apparatus of claim 1, further comprising a processing module, the processing module being coupled to the at least one light sensing unit and used for determining at least one touch point position formed by at least one object on the display unit according to the sensing result.

9. The optical touch apparatus of claim 1, wherein the sensing result relates to a comparing result between at least one object and a reference region, the reference region is disposed at a second side on the display unit opposite to the first side.

10. The optical touch apparatus of claim 9, wherein when the least one object blocks the at least one directional incident light above the display unit, a change of the image is caused, the at least one light sensing unit generates the sensing result according to the change of the image.

11. The optical touch apparatus of claim 10, wherein the reference region comprises at least one reference pattern, the at least one reference pattern is shown in a light and dark interlacing way, and compared with the at least one object to generate the comparing result.

12. The optical touch apparatus of claim 10, wherein the comparing result relates to a proportion of a covered region to the reference region, the covered region is formed when the at least one object blocks the at least one directional incident light.

* * * * *